US010173766B2

(12) United States Patent
Good et al.

(10) Patent No.: US 10,173,766 B2
(45) Date of Patent: *Jan. 8, 2019

(54) LATCH PIN ASSEMBLY

(71) Applicant: The Boeing Company, Chicago, IL (US)

(72) Inventors: Mark S. Good, Seattle, WA (US); Charles E. Jokisch, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/881,248

(22) Filed: Jan. 26, 2018

(65) Prior Publication Data

US 2018/0148159 A1 May 31, 2018

Related U.S. Application Data

(63) Continuation of application No. 14/824,858, filed on Aug. 12, 2015, now Pat. No. 9,914,524.

(Continued)

(51) Int. Cl.
*B64C 3/56* (2006.01)
*F15B 11/00* (2006.01)
*F15B 15/26* (2006.01)
*B64C 23/06* (2006.01)
*F15B 13/01* (2006.01)

(52) U.S. Cl.
CPC ............. *B64C 3/56* (2013.01); *B64C 23/072* (2017.05); *F15B 11/003* (2013.01); *F15B 13/01* (2013.01); *F15B 15/261* (2013.01); *F15B 2015/268* (2013.01); *F15B 2211/30515* (2013.01);

(Continued)

(58) Field of Classification Search
CPC .......... F15B 11/003; F15B 2211/30515; F15B 2211/72; B64C 3/56; B64C 3/546; B64C 23/065

See application file for complete search history.

(56) References Cited

U.S. PATENT DOCUMENTS 5,201,479 A  4/1993  Renzelmann
5,310,138 A  5/1994  Fitzgibbon
(Continued)

OTHER PUBLICATIONS

European Search Report for related European Application No. 16150592; report dated Jun. 9, 2016.

*Primary Examiner* — Philip J Bonzell
(74) *Attorney, Agent, or Firm* — Miller, Matthias & Hull LLP (57) ABSTRACT

A folding wing tip system of an aircraft includes a latch pin actuator having a primary mechanical lock and a secondary hydraulic lock. The mechanical lock may include a lock cam movable between a lock position, in which the lock cam engages the latch pin, and an unlock position, in which the lock cam is disengaged from the latch pin, and a first lock actuator mechanically coupled to the lock cam and configured to provide a bias force pushing the lock cam toward the lock position. The hydraulic lock may be disposed in an unlatching hydraulic line and has an initial state, in which fluid flow through the unlatching hydraulic line is blocked thereby to hold the latch pin in the latched position, and an open state, in which fluid flow through the unlatching hydraulic line is permitted thereby to permit retraction of the latch pin to the unlatched position.

20 Claims, 9 Drawing Sheets

Related U.S. Application Data (60) Provisional application No. 62/105,127, filed on Jan. 19, 2015.

(52) U.S. Cl.
CPC ..... *F15B 2211/329* (2013.01); *F15B 2211/72* (2013.01); *Y02T 50/164* (2013.01)

(56) References Cited

U.S. PATENT DOCUMENTS

| | | |
|---|---|---|
| 5,350,135 A | 9/1994 | Renzelmann et al. |
| 5,379,969 A | 1/1995 | Marx et al. |
| 5,381,986 A | 1/1995 | Smith et al. |
| 5,427,329 A | 6/1995 | Renzelmann |
| 5,452,643 A | 9/1995 | Smith et al. |
| 8,733,692 B2 | 5/2014 | Kordel et al. |
| 9,211,946 B2 | 12/2015 | Good et al. |
| 9,290,260 B2 | 3/2016 | Lassen et al. |
| 9,499,252 B2 | 11/2016 | Lassen et al. |
| 2003/0136124 A1 | 7/2003 | Albert |
| 2008/0099612 A1 | 5/2008 | Plude |
| 2013/0099060 A1 | 4/2013 | Dees et al. |
| 2013/0341467 A1 | 12/2013 | Sakurai et al. |
| 2014/0014768 A1 | 1/2014 | Lassen et al. |
| 2014/0061371 A1 | 3/2014 | Good et al. |
| 2014/0117150 A1 | 5/2014 | Good et al. |
| 2014/0208935 A1 | 7/2014 | Voiculescu |
| 2014/0284110 A1 | 9/2014 | Savage |
| 2015/0014478 A1 | 1/2015 | Lassen et al. |
| 2016/0176504 A1 | 6/2016 | Lassen et al. |

LATCH PIN ASSEMBLY

FIELD

The present disclosure relates generally to latch pin assemblies.

BACKGROUND

Latch pin assemblies may be used in applications requiring latching and locking of movable structures, such as folding wing tip systems used on aircraft. An airport taxiway and/or gate may have space (e.g., width) limitations, which limit a wingspan of an aircraft that may use the taxiway and/or the gate. However, the wingspan of the aircraft may correspond to a maximum possible passenger volume and/or cargo volume of the aircraft. Thus, to service a greater number of passengers, decrease fuel consumption and/or transport a larger amount of cargo, employment of an aircraft with a wingspan exceeding the space limitation of the taxiway and/or the gate may be desirable.

To employ an aircraft having a wingspan greater than the space limitation of a taxiway and/or a gate, the aircraft may be configured to have folding wing tip system for folding the tips of the wings to enable the aircraft to fit within the taxiway and/or the gate. Should the folding wing tip system fail to operate, however, it may prevent the aircraft from entering the taxiway and/or the gate. This not only affects the aircraft outfitted with the folding wing tip system, but also may also block other aircraft from entering the taxiway or gate, thereby causing a major disruption of airport operations. Thus, it is advantageous to provide a folding wing tip system that is highly reliable.

The wing tips may be secured in the spread position using latch pin assemblies. Latch pin assemblies typically include one or more latch pins sized for insertion through lugs provided on the fixed wing portion and wing tip. A latch pin actuator may move the latch pins between an extended position, in which the latch pins are inserted through the lugs to hold the wing tips in the spread position, and a retracted position, in which the latch pins are withdrawn from the lugs to permit the wing tips to be rotated to the folded position.

The latch pin assembly may further include a lock sub-assembly to lock the wing tips in the spread position during flight. The lock sub-assembly may include redundant locking mechanisms to ensure that the wing tips remain in the spread position in the event one of the locking mechanisms fails. For example, U.S. Pat. No. 5,201,479 to Renzelmann ('the '479 patent') discloses a latch pin lock for a folding wing aircraft that includes a primary lock having a primary locking body that mechanically engages the pin, and a secondary lock having a separate, secondary locking body that mechanically engages the pin independent of the primary locking body. While the '479 patent discloses a locking arrangement that reliably secures the pin in the extended position, the use of multiple, independent locking bodies requires additional space, adds weight to the aircraft, and introduces operational complexities.

SUMMARY

In accordance with one aspect of the present disclosure, a latch pin assembly for use with a hydraulic fluid source includes a latch pin defining an extend chamber and a retract chamber, the latch pin including a latch surface, a latching hydraulic line fluidly communicating between the extend chamber and the hydraulic fluid source, and an unlatching hydraulic line fluidly communicating between the retract chamber and the hydraulic fluid source. A mechanical lock engages the latch surface of the latch pin when in a lock position to mechanically lock the latch pin in a latched position, and a hydraulic lock is disposed in the latching hydraulic line and having an initial state, in which fluid flow is blocked from exiting the extend chamber through the latching hydraulic line, and an open state, in which fluid flow is permitted from the extend chamber through the latching hydraulic line.

In accordance with another aspect of the present disclosure, a locking assembly is provided for a latch pin assembly having a latch pin defining an extend chamber and a retract chamber, the latch pin including a latch surface, a latching hydraulic line fluidly communicating between the extend chamber and a hydraulic fluid source, and an unlatching hydraulic line fluidly communicating between the retract chamber and the hydraulic fluid source. The locking assembly includes a mechanical lock engaging the latch surface of the latch pin when in a lock position to mechanically lock the latch pin in a latched position, and a hydraulic lock disposed in the latching hydraulic line and having an initial state, in which fluid flow is blocked from exiting the extend chamber through the latching hydraulic line, and an open state, in which fluid flow is permitted from the extend chamber through the latching hydraulic line is permitted.

In accordance with a further aspect of the present disclosure, a method is provided of locking a latch pin in a latched position, the latch pin being provided in a latch pin assembly coupled to a hydraulic fluid source. The method includes mechanically locking the latch pin in the latched position by mechanically engaging the latch pin with a lock cam, and hydraulically locking the latch pin in the latched position by preventing fluid flow from exiting an extend chamber of the latch pin through a latching hydraulic line fluidly communicating between the hydraulic fluid source the extend chamber In another aspect of the disclosure that may be combined with any of these aspects, the mechanical lock includes a lock cam movable between a lock position, in which the lock cam engages the latch surface of the latch pin, and an unlock position, in which the lock cam is disengaged from the latch surface of the latch pin, and a first lock actuator mechanically coupled to the lock cam and configured to provide a bias force pushing the lock cam toward the lock position.

In another aspect of the disclosure that may be combined with any of these aspects, an unlocking actuator is operably coupled to the lock cam and configured to provide an unlock force counteracting the bias force of the first lock actuator.

In another aspect of the disclosure that may be combined with any of these aspects, the unlocking actuator includes a hydraulic actuator, and the latch pin assembly further includes an unlocking hydraulic line fluidly communicating between the hydraulic actuator and the hydraulic fluid source.

In another aspect of the disclosure that may be combined with any of these aspects, the hydraulic actuator is movable between a normal position, in which the unlock force is less than the bias force, and an actuated position, in which the unlock force is greater than the bias force.

In another aspect of the disclosure that may be combined with any of these aspects, a sequencing valve is mechanically coupled to the hydraulic actuator and fluidly coupled to the hydraulic lock by a pilot line, the sequencing valve being movable between a blocking state when the hydraulic actuator is in the normal position to prevent fluid flow through the pilot line, and a free state when the hydraulic actuator is in the actuated position to permit fluid flow through the pilot line.

In another aspect of the disclosure that may be combined with any of these aspects, the hydraulic lock is configured to move to the open state when hydraulic fluid flows through the pilot line.

In another aspect of the disclosure that may be combined with any of these aspects, a piston is provided that includes a piston head, wherein the latch pin encloses the piston head and defines an inner chamber, and wherein the piston head separates the inner chamber into the extend chamber and the retract chamber.

In another aspect of the disclosure that may be combined with any of these aspects, the latch pin assembly is provided on an aircraft that comprises a fixed wing portion including a first set of lugs and an unfixed wing portion including a second set of lugs, and in which the latch pin is sized for insertion through the first and second sets of lugs.

In another aspect of the disclosure that may be combined with any of these aspects, mechanically locking the latch pin includes actuating a first lock actuator to bias the lock cam toward a lock position, wherein the lock cam in the locked position mechanically engages the latch pin.

In another aspect of the disclosure that may be combined with any of these aspects, a check valve is disposed in the latching hydraulic line and has an initial state, in which fluid flow through the latching hydraulic line is blocked, and an open state, in which fluid flow through the latching hydraulic line is permitted, and in which hydraulically locking the latch pin comprises placing the check valve in the initial state.

In another aspect of the disclosure that may be combined with any of these aspects, the latch pin includes a latch pin surface, and in which mechanically locking the latch pin comprises mechanically engaging the lock cam with the latch pin surface

It should be understood that the drawings are not necessarily drawn to scale and that the disclosed embodiments are sometimes illustrated schematically. It is to be further appreciated that the following detailed description is merely exemplary in nature and is not intended to limit the invention or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
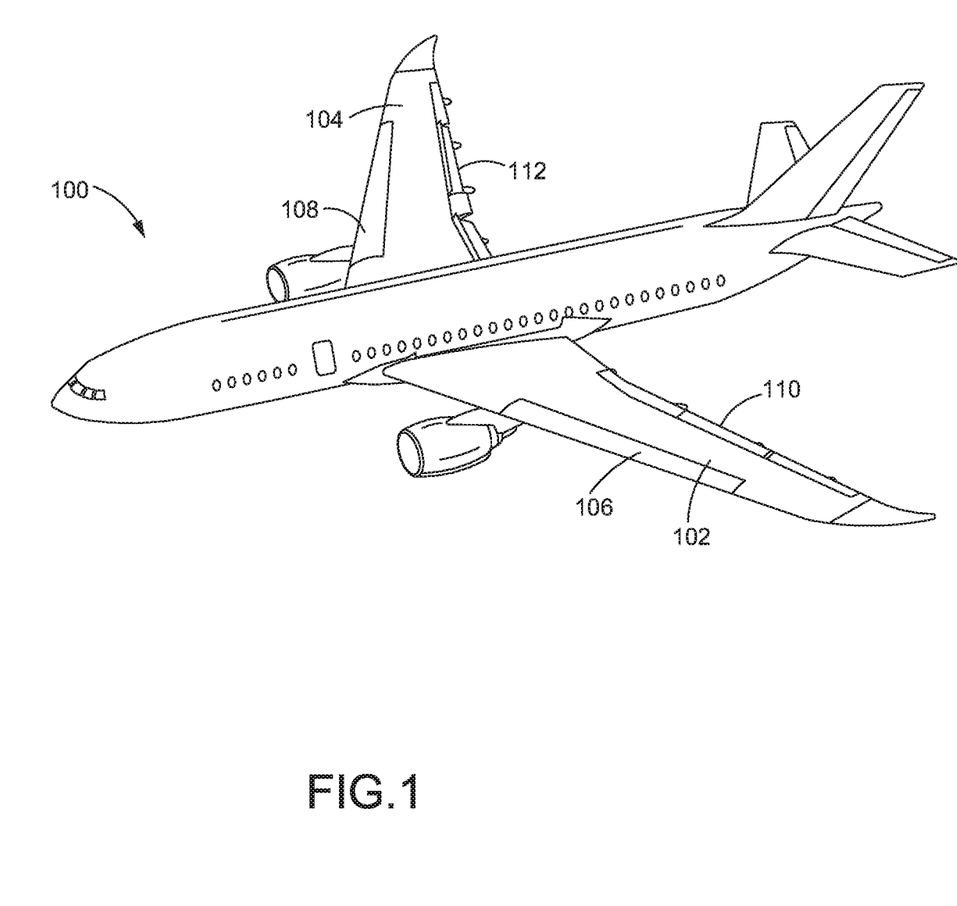
FIG. 1 illustrates an example aircraft that may be used to implement the examples disclosed herein.

FIG. 1 is a perspective view of an example aircraft 100 in which aspects of the present disclosure may be implemented. The example aircraft 100 of FIG. 1 includes a first wing 102 and a second wing 104. The first wing 102 and the second wing 104 each include a leading edge 106 and 108 and a trailing edge 110 and 112.

Figure 2:
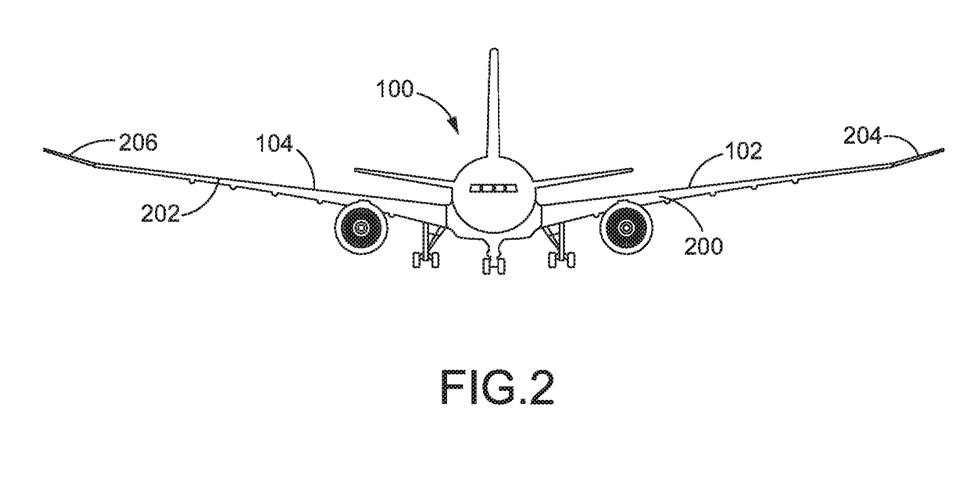
FIG. 2 illustrates the wings of the example aircraft of FIG. 1 in a spread position.

FIG. 2 is a front view of the example aircraft 100 of FIG. 1. The first wing 102 and the second wing 104 each include a first portion 200 and 202 (i.e., an inboard portion) and a second portion 204 and 206 (i.e., a tip portion). In the illustrated example of FIG. 2, the second portion 204 of the first wing 102 and the second portion 206 of the second wing 104 are in a spread or flight position. When the second portion 204 of the first wing 102 and the second portion 206 of the second wing 104 are in the spread position, the first wing 102 and the second wing 104 each provide a substantially continuous airfoil. As described in greater detail below, the second portion 204 of the first wing 102 and/or the second portion 206 of the second wing 104 may be locked into the spread position.

Figure 3:
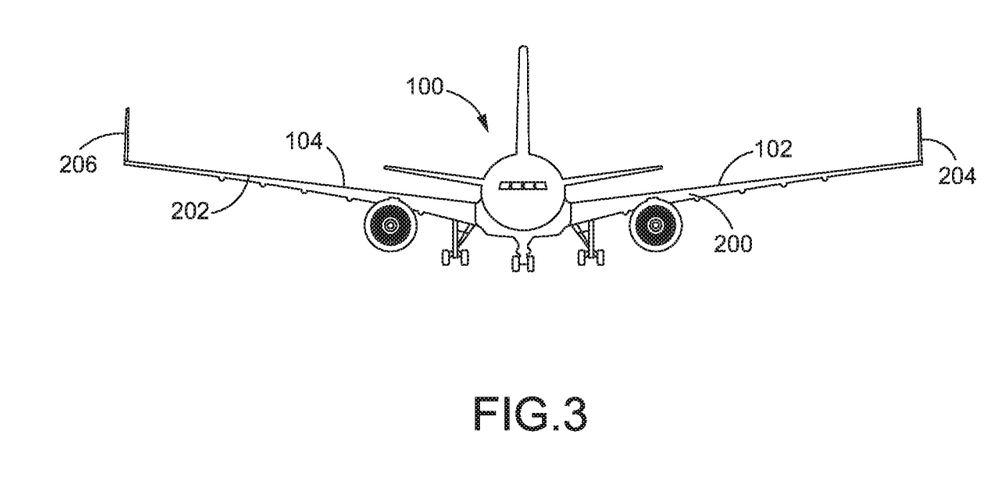
FIG. 3 illustrates portions of the wings of the example aircraft of FIG. 1 in a folded position.

FIG. 3 illustrates the example aircraft 100 of FIGS. 1 and 2 in which the second portion 204 of the first wing 102 and the second portion 206 of the second wing 104 are in a folded position. In most cases, when the second portion 204 of the first wing 102 and the second portion 206 of the second wing 104 are in the folded position, a wingspan of the aircraft 100 is less than a wingspan of the aircraft 100 when the second portion 204 of the first wing 102 and the second portion 206 of the second wing 104 are in the spread position. In the example illustrated in FIG. 3, to achieve the folded position, the second portion 204 of the first wing 102 and the second portion 206 of the second wing 104 are rotated upward relative to the first portions 200 and 202 such that the second portion 204 of the first wing 102 and the second portion 206 of the second wing 104 are oriented substantially vertically. In other examples, to achieve the folded position, the second portion 204 of the first wing 102 and the second portion 206 of the second wing 104 are rotated downward relative to the first portion 200 of the first wing 102 and the first portion 202 of the second wing 104, respectively, with the aircraft 100 viewed in the orientation of FIG. 2.

Figure 4A:
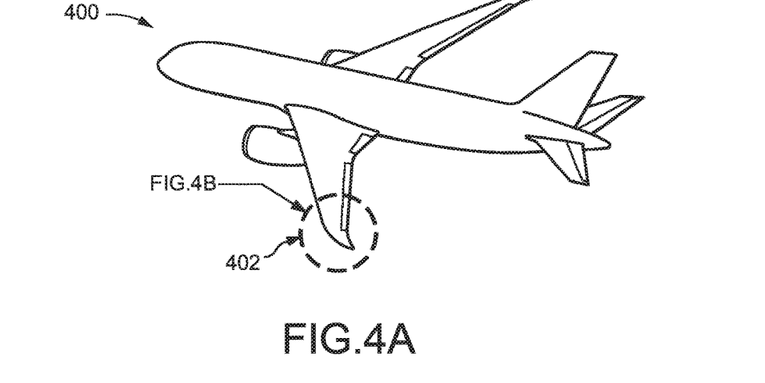
FIG. 4A is a diagram of a location of a folding wing tip system in a wing.
Figure 4B:
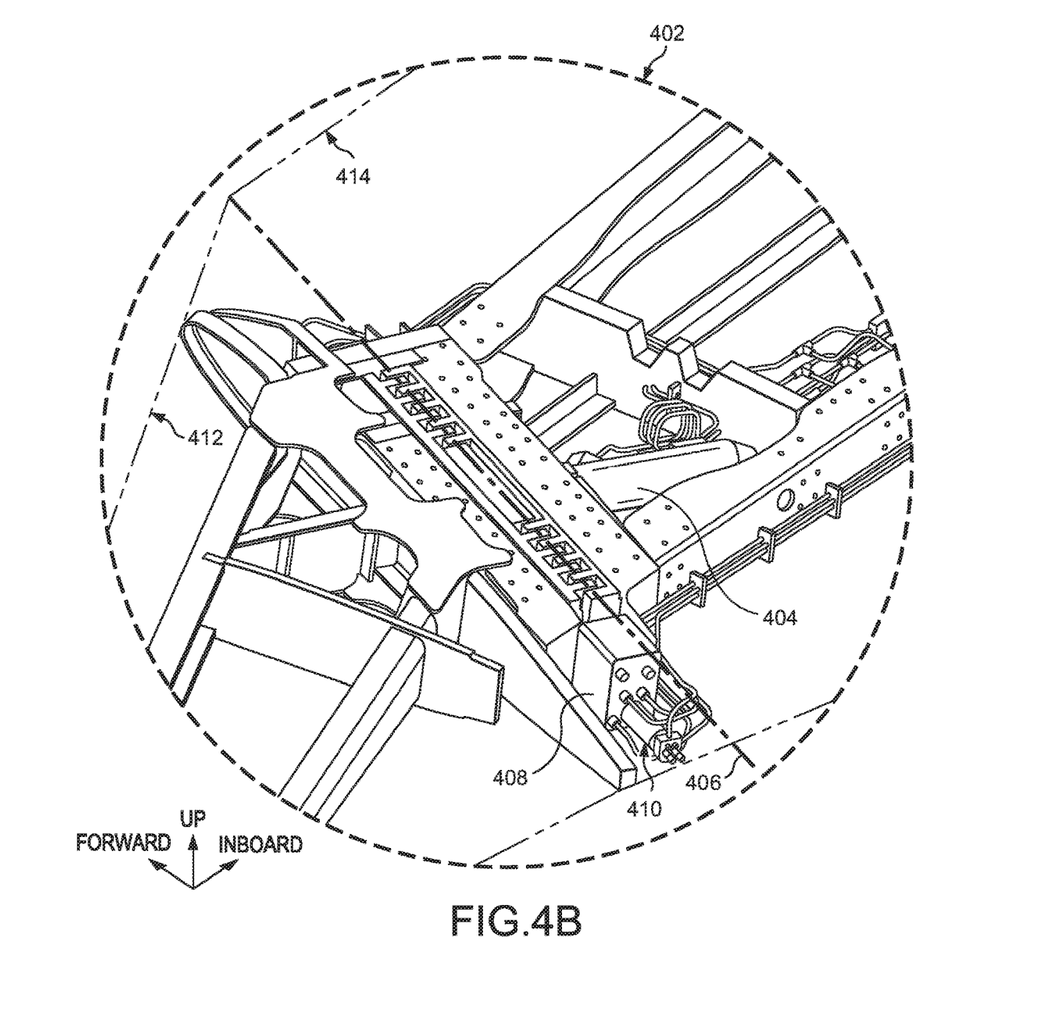
FIG. 4B is a perspective top view diagram of selected elements of a folding wing tip system with the wing in a flight position in accordance with an illustrative embodiment.

FIG. 4A is a diagram of a location of a folding wing tip system in a wing and FIG. 4B is a perspective top view diagram of selected elements of a folding wing tip system with the wing in a flight position in accordance with an illustrative embodiment. More specifically, FIG. 4A depicts a location for folding wing tip system 402 on aircraft 400. The illustration presents an area of a left wingtip of aircraft 400, such as shown for unfixed portion of aircraft 100 in FIG. 1. An inverse arrangement may be applicable for a right wingtip of an aircraft 100.

With reference to FIG. 4B, folding wing tip system 402 may include: fold actuator 404, centerline of rotation 406, second latch 408, second latch actuator 410, unfixed portion 412, and fixed portion 414. A first latch may be located at a forward edge of the folding wing tip system, but is not visible in this view. Unfixed portion 412 may be rotatably connected to fixed portion 414 about centerline of rotation 406 of unfixed portion 412.

Figure 5:
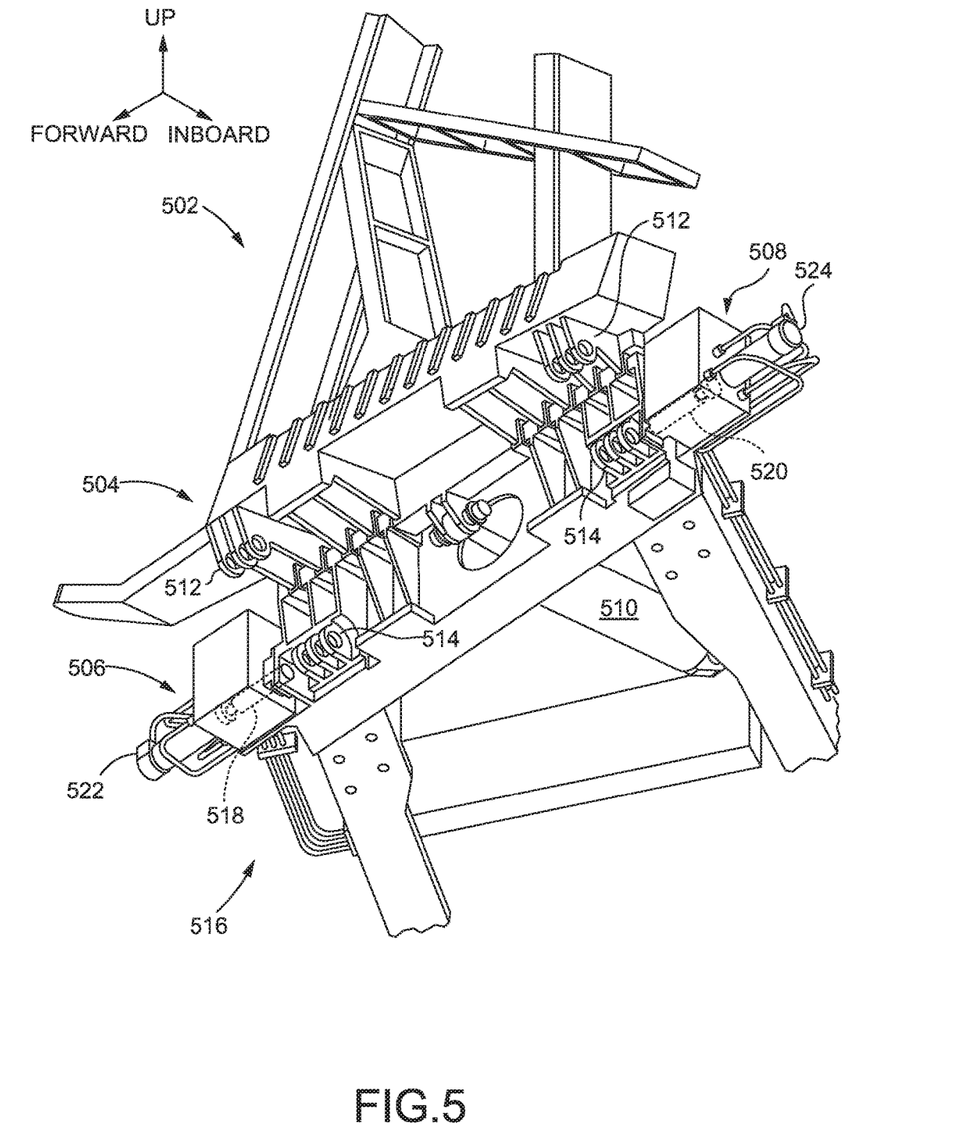
FIG. 5 is a perspective view diagram of a folding wing tip system with a wing in a folded position in accordance with an illustrative embodiment.

FIG. 5 is a perspective view diagram of folding wing tip system with a wing in a folded position in accordance with an illustrative embodiment. More specifically, the side perspective viewpoint looks up and in toward fixed portion 516 of folding wing tip system 502 in the folded position. Folding wing tip system 502 is shown with unfixed portion 504 of the wing raised in folded position.

Folding wing tip system 502 may include: unfixed portion 504, first latch 506, second latch 508, fold actuator 510, wingtip lug 512, inner lug 514, fixed portion 516, a first latch pin 518, and a second latch pin 520. Unfixed portion 504 may be in the folded position due to extension of fold actuator 510 while first latch pin 518 within first latch 506 and second latch pin 520 within second latch 508 may each be retracted by first latch actuator 522 and second latch actuator 524 respectively. In the open position, each latch actuator may retract its respective latch pin from engagement with the lugs 812, 814.

Figure 6:
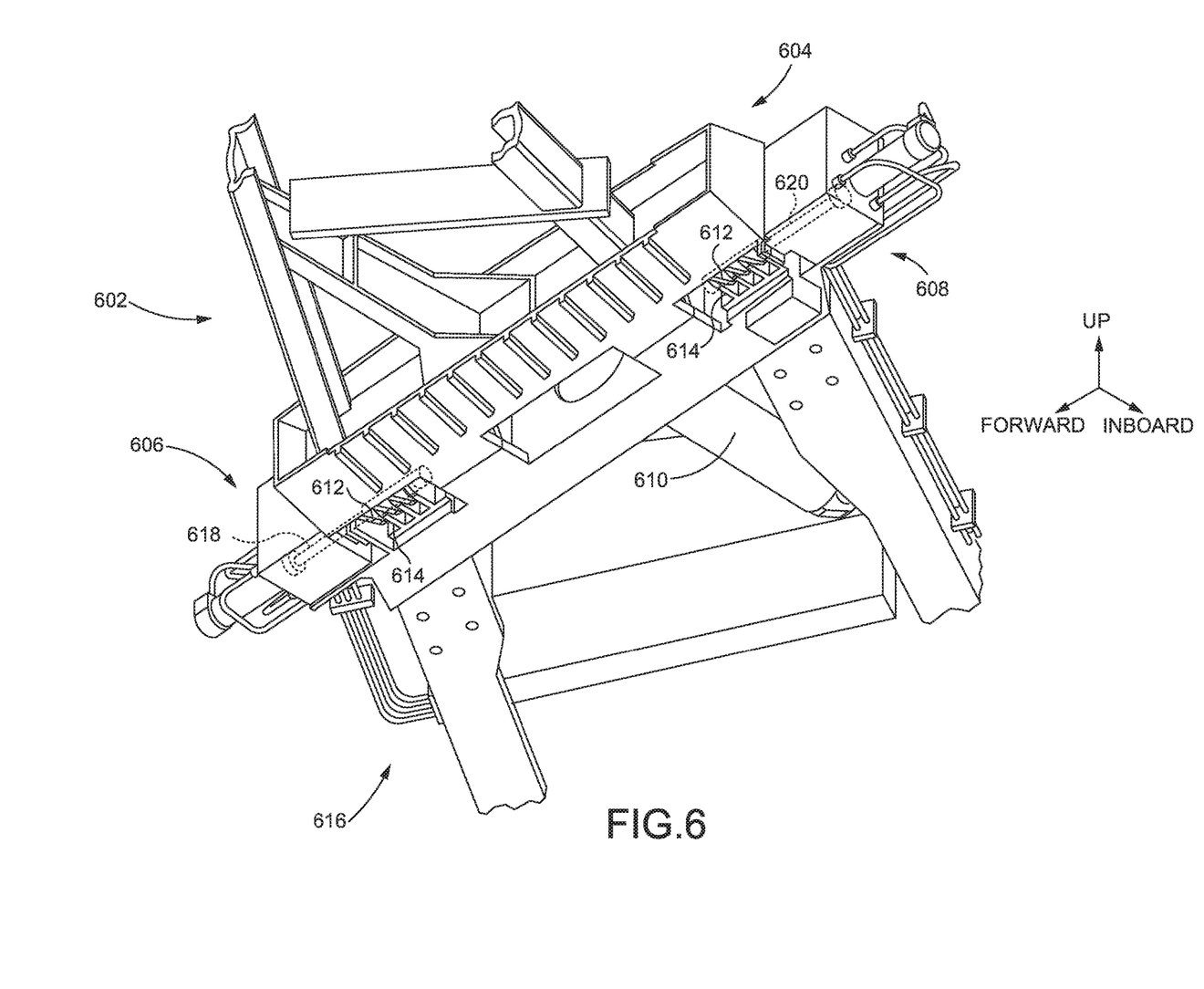
FIG. 6 is a perspective view diagram of the folding wing tip system of FIG. 5 with a wing in a flight position in accordance with an illustrative embodiment.

FIG. 6 is a perspective view diagram of folding wing tip system with a wing in a flight position in accordance with an illustrative embodiment. More specifically, FIG. 6 presents a view looking up and in toward folding wing tip system 602 with unfixed portion 604 of a wing lowered in the flight position. First latch 606 and second latch 608 may each be in a closed position. Retraction of an extension member of fold actuator 610 may have moved unfixed portion 604 to the flight position. First latch pin 618 within first latch 606 and second latch pin 620 within second latch 608 may have been extended to closed positions by their respective latch actuators.

Figure 7:
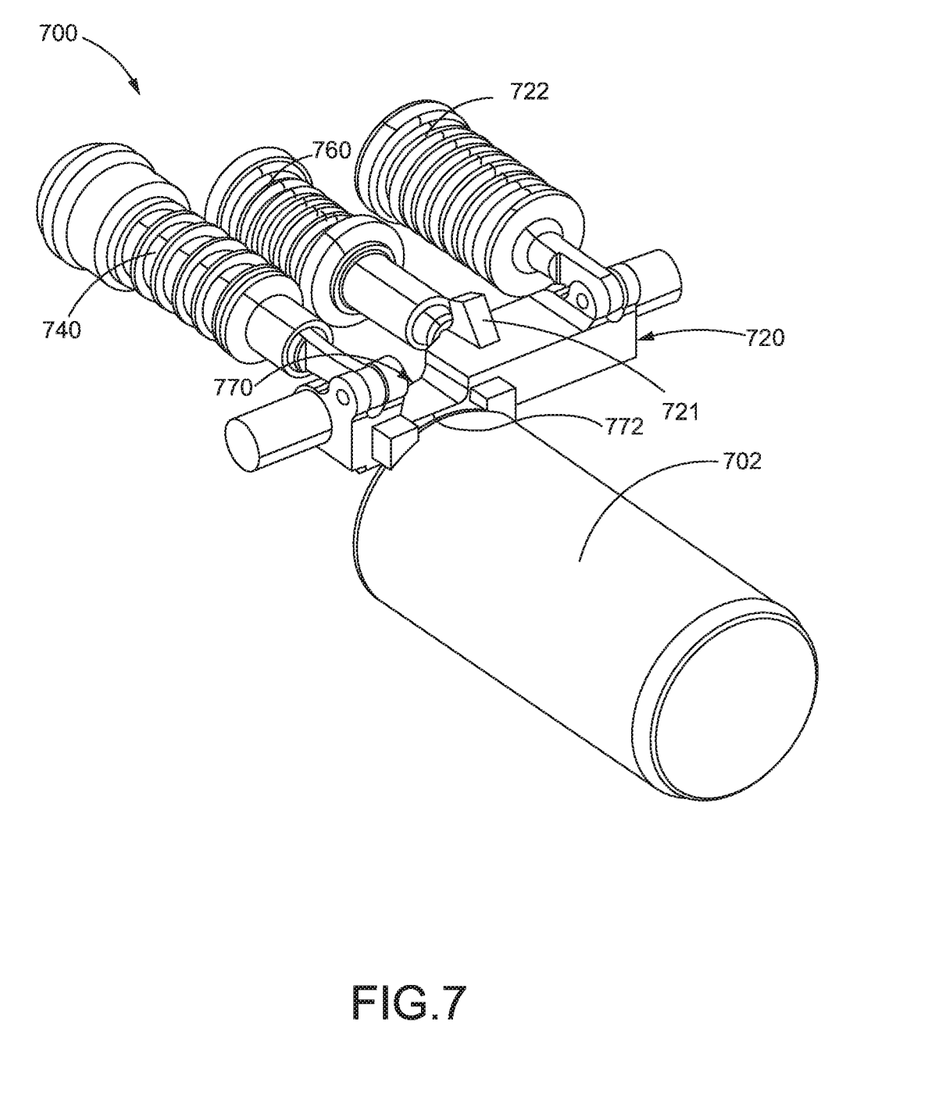
FIG. 7 is a perspective view of an exemplary latch pin assembly in for use in the folding wing tip system of FIG. 6.
Figure 8:
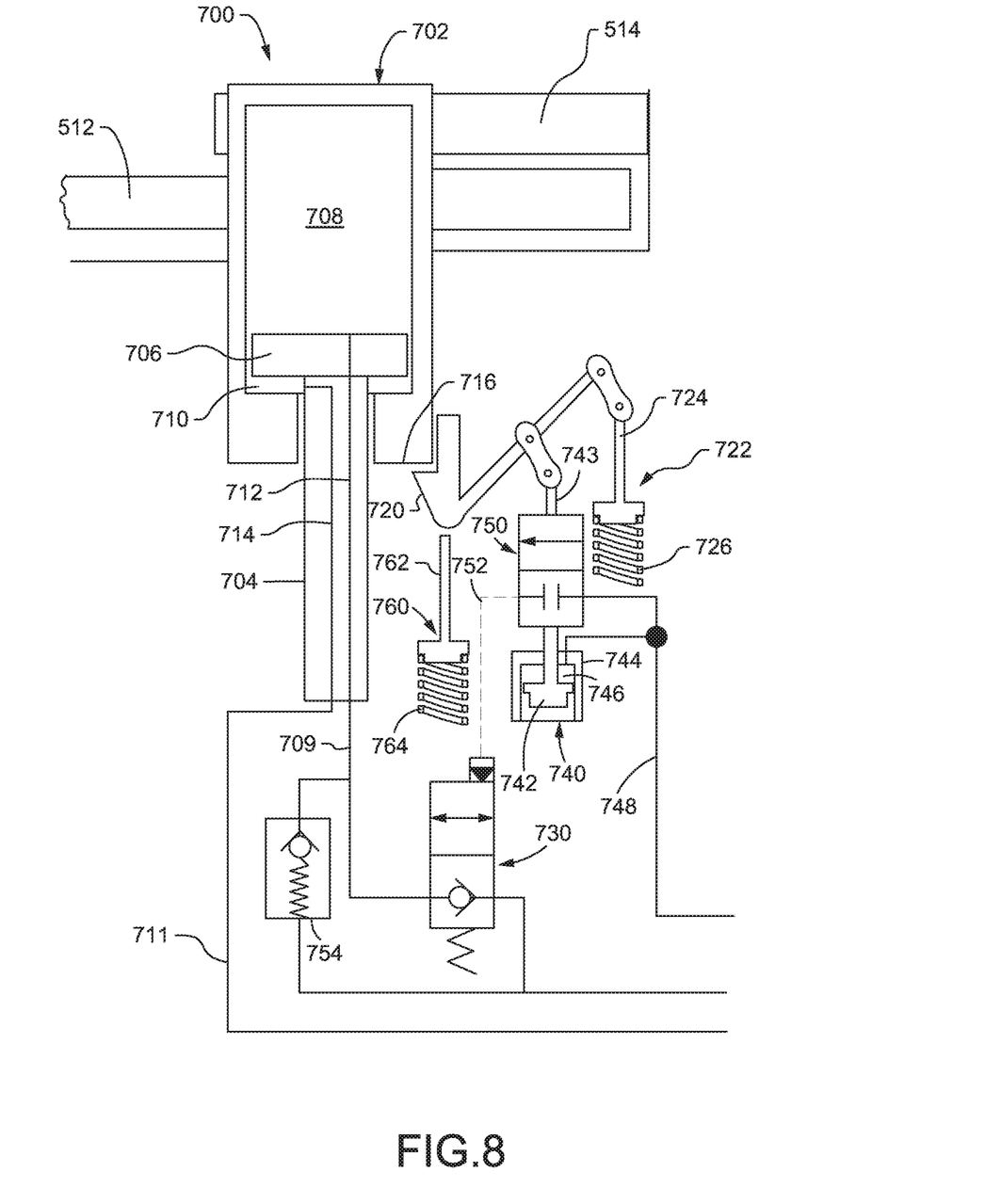
FIG. 8 is a schematic diagram of the latch pin assembly of FIG. 7.

The folding wing tip system may further include a plurality of latch pin assemblies 700, with a single latch pin assembly 700 illustrated in FIGS. 7 and 8. The exemplary latch pin assembly 700 includes a latch pin 702 slidably supported on a latch pin piston 704 (FIG. 8) for movement between latched and unlatched positions. In the illustrated embodiment, the latch pin 702 defines an internal chamber that is divided by a head 706 of the piston into an extend chamber 708 and a retract chamber 710. The extend chamber 708 fluidly communicates with a latching hydraulic line 709 through a first channel 712 in the piston 704, while the retract chamber 710 fluidly communicates with an unlatching hydraulic line 711 through a second channel 714 in the piston 704. When hydraulic fluid is supplied to the extend chamber 708 through the latching hydraulic line 709, the latch pin 702 extends outwardly and through the wingtip lug(s) 512, and inner lug(s) 514 to the latched position as schematically shown in FIG. 8, thereby to secure the unfixed portion 605 of the wing in the flight position. Conversely, when hydraulic fluid is supplied to the retract chamber 710 through the unlatching hydraulic line 711, the latch pin 702 retracts inwardly to withdraw from the wingtip lug(s) 512 and/or inner lug(s) 514 to the unlatched position, thereby to permit the unfixed portion 605 to rotate relative to the fixed portion of the wing.

Figure 11:
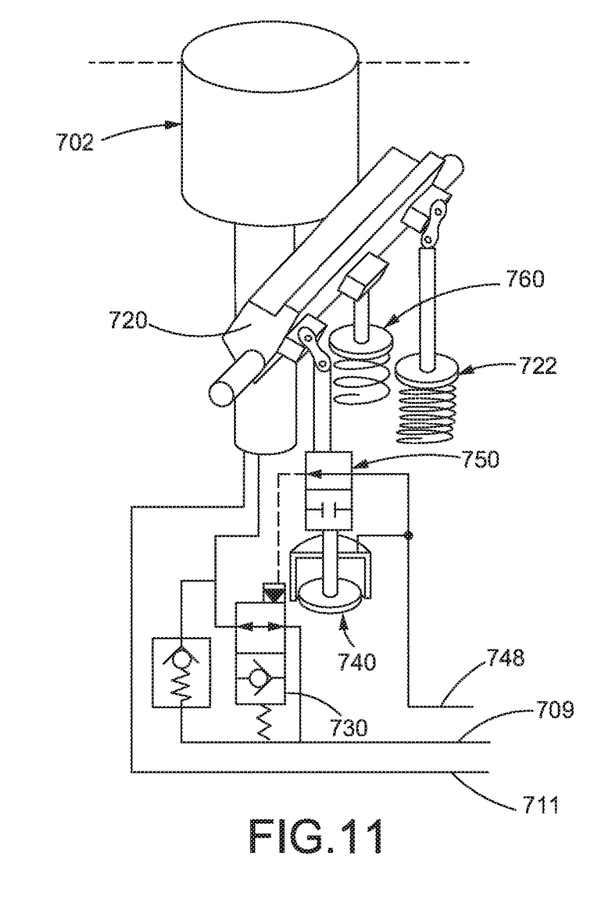
FIG. 11 is a schematic diagram of the latch pin assembly with the locking cam in an unlocked position.

The latch pin assembly 700 further includes a first lock in the form of a mechanical lock to hold the latch pin 702 in the latched and prevent unintended retraction to the unlatched position. As shown in FIGS. 7 and 8, the first lock may include a lock cam 720 having a lock position in which the lock cam 720 engages a latch surface 716 of the latch pin 702 to mechanically hold the latch pin 702 in the latched position. The lock cam 720 may rotate to an unlock position in which the lock cam 720 is disengaged from the latch surface 716 as best shown in FIG. 11. The first lock may further include a first lock actuator 722 configured to bias the lock cam 720 toward the lock position. In the illustrated embodiment, the first lock actuator 722 includes a spring cartridge that includes a linkage arm 724 mechanically coupled to the lock cam 720 and a spring 726 engaging the linkage arm 724, wherein the spring cartridge is oriented to provide a bias force that pushes the lock cam 720 toward the lock position.

Figure 10:
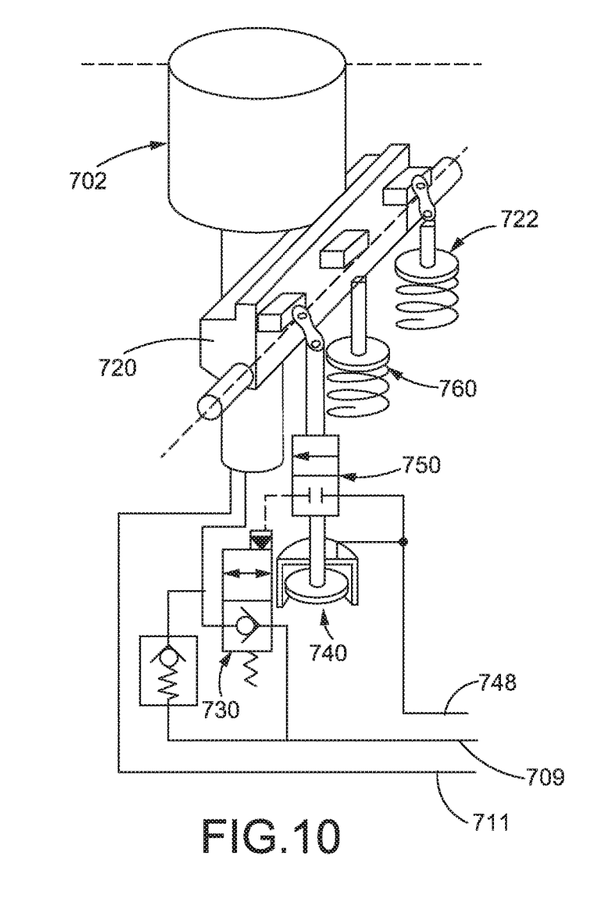
FIG. 10 is a schematic diagram of the latch pin assembly with a locking cam in a locked position.

The latch pin assembly 700 may also include a second lock in the form of a hydraulic lock 730 which uses hydraulic fluid to prevent unintended retraction of the latch pin 702. As shown in FIG. 7, the hydraulic lock 730 is provided as a check valve positioned in the latching hydraulic line 709 communicating between the extend chamber 708 and a hydraulic system provided on the aircraft. The check valve is oriented to have an initial state (as shown in FIGS. 8 and 10) which prevents fluid from exiting the extend chamber 708, thereby to hydraulically hold the latch pin 702 in the latched position. The check valve may be movable from the initial state to an open state (as best shown in FIG. 11) in which fluid is permitted to freely flow through the unlatching hydraulic line 709 into or out of the extend chamber 708. In an exemplary embodiment, the check valve is provided as a zero leak check valve.

The latch pin assembly 700 further includes an unlocking actuator 740 configured to move the lock cam 720 to the unlock position, thereby permitting the latch pin 702 to retract. The unlocking actuator 740 may be provided as a hydraulic actuator having a piston 742 with an arm 743 coupled to the lock cam 720 and a head disposed in a housing 744 defining an unlocking chamber 746 (FIG. 8). The unlocking chamber 746 may fluidly communicate with the aircraft hydraulic system through an unlocking hydraulic line 748. When hydraulic fluid is supplied to the unlocking chamber 746, the piston 742 may move from a normal position to an actuated position. The piston 742 is commanded to the normal position when it is desired to hold the lock cam 720 in the locked position (thereby supporting the latch pin 702 in the latched position). As best shown in FIG. 8, the normal position of the piston 742 corresponds to an upper position of the piston 742 within the housing 744. With the piston 742 in the normal position, the unlocking actuator 740 permits the bias force of the first lock actuator 722 to hold the lock cam 720 in the locked position. In the illustrated embodiment, the actuated position of the piston 742 corresponds to a lower position of the piston 742 within the housing, such as the position shown in FIG. 11. In the actuated position, the piston 742 generates an unlock force in a direction and with a magnitude that is sufficient to counteract the bias force of the first lock actuator 722, thereby to move the lock cam 720 to the unlock position.

In the illustrated embodiment, a sequencing valve 750 is mechanically coupled to the unlocking actuator 740 for sequencing operation of the first and second locks. As shown in FIG. 8, the sequencing valve 750 fluidly communicates with the unlocking hydraulic line 748 and has a pilot line 752 fluidly communicating with the hydraulic lock 730. The sequencing valve has a blocking state (as shown in FIG. 8) when the hydraulic actuator 740 is in the normal position, in which fluid flow through the pilot line 752 is blocked. When the hydraulic actuator 740 moves to the actuated position it also moves the sequencing valve 750 to a free state, in which fluid flow is permitted through the pilot line 752.

A valve 754 may be provided in the unlatching hydraulic line 709 to relieve fluid pressure due to thermal expansion. In the illustrated embodiment, the thermal relief valve 754 is provided in parallel with the hydraulic lock 730.

Still further, the latch pin assembly 700 may include an inhibit assembly 760 to provide for further sequencing of operations during actuation of the latch pin 702 and/or lock cam 720. The inhibit assembly may include an in inhibit pin 762 and an inhibit spring 764. The inhibit pin 762 has a tip that is spaced from the lock cam 720 when the lock cam is in the locked position. As the lock cam 720 rotates from the locked position, it will engage the inhibit pin 762 to permit further sequencing of operations, as described more fully below. In the illustrated embodiment, the lock cam 720 includes a boss 721 (FIG. 7) configured to engage the inhibit pin 762 at the desired point during rotation of the lock cam 720.

Figure 9:
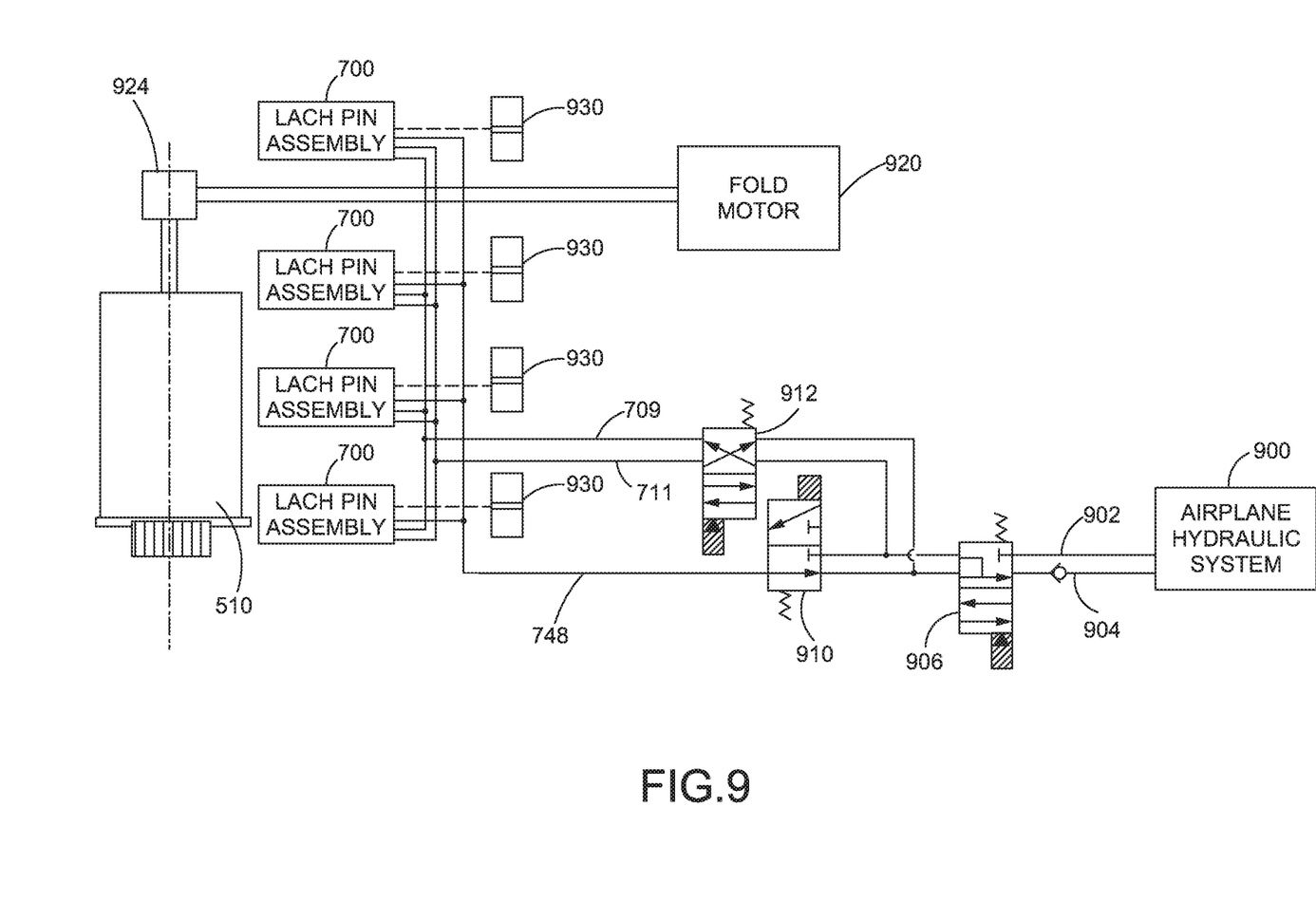
FIG. 9 is a schematic diagram of the hydraulic connections between the latch pin assembly and a hydraulic system provided on the aircraft.

FIG. 9 is a schematic diagram showing the hydraulic connections between four latch pin assemblies 700 and the aircraft hydraulic system 900, which includes a supply line 902 and a return line 904. An isolation valve 906 is disposed in the supply and return lines 902, 904 between the aircraft hydraulic system 900 and the latch pin assemblies 700. Additionally, a latch pin unlock valve 910 is connected to both the supply and return lines 902, 904 on one side and the unlocking hydraulic line 748 on the other side. Still further, a latch pin actuation valve 912 is connected to both the supply and return lines 902, 904 on one side and the latching and unlatching hydraulic lines 709, 711 on the other side. Also shown in FIG. 9 is a fold motor 920 operably coupled to the fold actuator 510 by an angle gearbox 924. Additionally, FIG. 9 illustrates a lock cam position sensor 930 associated with each of the latch pin actuators for providing feedback regarding a position of each lock cam 720.

The aircraft hydraulic system 900 may be configured to place the latch pin 702 in the latched position and the lock cam 720 in the locked position, as shown in FIG. 10. For example, the latch pin 702 initially may be placed in the latched position. This may be accomplished by placing the isolation valve 906 in an open position (opposite the position shown in FIG. 9), the latch pin unlock valve 910 in a closed position (as shown in FIG. 9), and the latch pin actuation valve 912 in an extend position (as shown in FIG. 9), so that the unlocking hydraulic line 748 communicates with the return line 904, the latching hydraulic line 709 fluidly communicates with the supply line 902, and the unlatching hydraulic line 711 fluidly communicates with the return line 904. In this state, hydraulic fluid is supplied to the extend chamber 708 so that the latch pin 702 moves to the latched position. With the unlocking hydraulic line 748 communicating with the return line 904, the unlocking actuator 740 generates little or no unlocking force so that bias force of the first lock actuator 722 will move the lock cam 720 to the locked position. With the latch pin 702 extended to the latched position, the isolation valve 906 may be moved to the closed position (as shown in FIG. 9).

To move the lock cam 720 to the unlocked position as shown in FIG. 11, the isolation valve 906 is moved to the open position (opposite the position shown in FIG. 9) and the latch pin unlock valve 910 is moved to an open position (opposite the position shown in FIG. 9), so that the supply line 902 fluidly communicates with the unlocking hydraulic line 748. Hydraulic fluid will flow to the unlocking actuator 740 and move it to the actuated position, thereby generating sufficient unlocking force to overcome the bias force of the first lock actuator 722 and rotate the lock cam 720 to the unlocked position shown in FIG. 11.

At this point, while the lock cam 720 has been rotated to the unlocked position, the hydraulic lock 730 will still prevent retraction of the latch pin 702 from the latched position. As the unlocking actuator 740 moves to the actuated position, however, the sequencing valve 750 is moved to the open position to permit hydraulic fluid to flow through the pilot line 752 to the hydraulic lock 730, thereby moving the hydraulic lock 730 to the open state as shown in FIG. 11. With the hydraulic lock 730 in the open position, the latch pin actuation valve 912 may be moved to a retract position (opposite the position shown in FIG. 9) so that the latching hydraulic line 709 fluidly communicates with the return line 904 and the unlatching hydraulic line 711 fluidly communicates with the supply line 902, thereby directing hydraulic fluid into the retract chamber 710 to move the latch pin 702 to the unlatched position.

In embodiments that include the inhibit assembly 760, the lock cam 720 may be supported in an "unlocked, inhibited" position that is intermediate the locked position and the unlocked position. That is, when the unlocking actuator 740 moves to the actuated position, the lock cam 720 may rotate from the locked position towards the unlocked position until the inhibit pin 762 engages the boss 721 of the lock cam 720. The lock cam 720 may be held in this intermediate position until the hydraulic lock 730 is disabled and the latch pin 702 is retracted to the unlatched position, as movement of the latch pin 702 will overcome the force of the inhibit spring 764 to retract the inhibit pin 762 and allow the lock cam 720 to rotate fully to the unlocked position. That is, as the latch pin 702 retracts, it may engage the inhibit pin 762 to move the inhibit pin 762 out of the path of the lock cam 720, thereby permitting the latch pin 702 to fully retract to the unlatched position. With the latch pin 702 fully retracted, the fold motor 920 may be operated to cause the fold actuator 510 to move the wing tip to the folded position, after which the system may again be isolated by moving the isolation valve 906 back to the isolation position.

The exemplary latch pin assembly 700 further may be configured to facilitate identification of a mechanical failure of the lock cam 720. Repeated actuation of the latch pin 702 may wear down portions of the lock cam 720 that contact the latch pin 702. This wear on the lock cam 720 may remove an area of material that would normally engage the latch pin 702 when the lock cam 720 is in the locking position, thereby preventing the lock cam 720 from performing its primary function of locking the latch pin 702 in the latched position. It would be advantageous, therefore, for the lock pin actuator to facilitate identification of such wear to expedite any needed repair and minimize aircraft downtime.

In the exemplary embodiment illustrated herein, a portion of the lock cam 720 used to lock the latch pin 702 in the latched position is fully disposed in the travel path of the latch pin 702. As best shown in FIG. 7, the lock cam 720 includes a recess 770 that creates a localized area of reduced thickness in the lock cam 720. The recess 770 is formed adjacent a contact portion 772 of the lock cam 720 that engages the latch pin 702 when the lock cam 720 is in the locked position. Thus, should the contact portion 772 wear down significantly such that the lock cam 720 no longer secures the latch pin 702 in the latched position, the lock cam 720 will fail in manner that is easily detectable. More specifically, with the contact portion 772 completely worn, the lock cam 720 will not transfer rotation applied to a first portion of the lock cam 720 located on one side of the recess 770 to a second portion of the lock cam 720 located on the opposite side of the recess 770. Accordingly, torque provided by the unlocking actuator 740, which is applied to a first portion of the lock cam 720 located on a first side of the recess 770, will not cause a resultant rotation of a second portion of the lock cam 720 located on an opposite side of the recess 770. The lock cam position sensor 930 may be positioned to detect the position of the second portion of the lock cam 720, and therefore a mechanical failure of the lock cam 720 may be quickly identified by comparing the command input to the lock cam position feedback.

Although certain example methods, apparatus and articles of manufacture have been described herein, the scope of coverage of this disclosure is not limited thereto. On the contrary, this disclosure covers all methods, apparatus and articles of manufacture fairly falling within the scope of the claims.

What is claimed is:

1. A latch pin assembly for use with a hydraulic fluid source, the latch pin assembly comprising:
   a latch pin defining an extend chamber and a retract chamber, the latch pin including a latch surface;
   a latching hydraulic line fluidly communicating between the extend chamber and the hydraulic fluid source;
   an unlatching hydraulic line fluidly communicating between the retract chamber and the hydraulic fluid source;
   a mechanical lock engaging the latch surface of the latch pin when in a lock position to mechanically lock the latch pin in a latched position; and
   a hydraulic lock disposed in the latching hydraulic line and having an initial state, in which fluid flow is blocked from exiting the extend chamber through the latching hydraulic line, and an open state, in which fluid flow is permitted from the extend chamber through the latching hydraulic line.

2. The latch pin assembly of claim 1, in which the mechanical lock comprises:
   a lock cam movable between a lock position, in which the lock cam engages the latch surface of the latch pin, and an unlock position, in which the lock cam is disengaged from the latch surface of the latch pin; and
   a first lock actuator mechanically coupled to the lock cam and configured to provide a bias force pushing the lock cam toward the lock position.

3. The latch pin assembly of claim 2, further comprising an unlocking actuator operably coupled to the lock cam and configured to provide an unlock force counteracting the bias force of the first lock actuator.

4. The latch pin assembly of claim 3, in which the unlocking actuator comprises a hydraulic actuator, and the latch pin assembly further includes an unlocking hydraulic line fluidly communicating between the hydraulic actuator and the hydraulic fluid source.

5. The latch pin assembly of claim 4, in which the hydraulic actuator is movable between a normal position, in which the unlock force is less than the bias force, and an actuated position, in which the unlock force is greater than the bias force.

6. The latch pin assembly of claim 4, further comprising a sequencing valve mechanically coupled to the hydraulic actuator and fluidly coupled to the hydraulic lock by a pilot line, the sequencing valve being movable between a blocking state when the hydraulic actuator is in the normal position to prevent fluid flow through the pilot line, and a free state when the hydraulic actuator is in the actuated position to permit fluid flow through the pilot line.

7. The latch pin assembly of claim 6, in which the hydraulic lock is configured to move to the open state when hydraulic fluid flows through the pilot line.

8. The latch pin assembly of claim 1, further comprising a piston including a piston head, wherein the latch pin encloses the piston head and defines an inner chamber, and wherein the piston head separates the inner chamber into the extend chamber and the retract chamber.

9. The latch pin assembly of claim 1, in which the latch pin assembly is provided on an aircraft that comprises a fixed wing portion including a first set of lugs and an unfixed wing portion including a second set of lugs, and in which the latch pin is sized for insertion through the first and second sets of lugs.

10. A locking assembly for a latch pin assembly having a latch pin defining an extend chamber and a retract chamber, the latch pin including a latch surface, a latching hydraulic line fluidly communicating between the extend chamber and a hydraulic fluid source, and an unlatching hydraulic line fluidly communicating between the retract chamber and the hydraulic fluid source, the locking assembly comprising:
    a mechanical lock engaging the latch surface of the latch pin when in a lock position to mechanically lock the latch pin in a latched position; and
    a hydraulic lock disposed in the latching hydraulic line and having an initial state, in which fluid flow is blocked from exiting the extend chamber through the latching hydraulic line, and an open state, in which fluid flow is permitted from the extend chamber through the latching hydraulic line is permitted.

11. The locking assembly of claim 10, in which the mechanical lock comprises:
    a lock cam movable between a lock position, in which the lock cam engages the latch surface of the latch pin, and an unlock position, in which the lock cam is disengaged from the latch surface of the latch pin; and
    a first lock actuator mechanically coupled to the lock cam and configured to provide a bias force pushing the lock cam toward the lock position.

12. The locking assembly of claim 11, further comprising an unlocking actuator operably coupled to the lock cam and configured to provide an unlock force counteracting the bias force of the first lock actuator.

13. The locking assembly of claim 12, in which the unlocking actuator comprises a hydraulic actuator and an unlocking hydraulic line fluidly communicating between the hydraulic actuator and the hydraulic fluid source.

14. The locking assembly of claim 13, in which the hydraulic actuator is movable between a normal position, in which the unlock force is less than the bias force, and an actuated position, in which the unlock force is greater than the bias force.

15. The locking assembly of claim 13, further comprising a sequencing valve mechanically coupled to the hydraulic actuator and fluidly coupled to the hydraulic lock by a pilot line, the sequencing valve being movable between a blocking state when the hydraulic actuator is in the normal position to prevent fluid flow through the pilot line, and a free state when the hydraulic actuator is in the actuated position to permit fluid flow through the pilot line.

16. The locking assembly of claim 15, in which the hydraulic lock is configured to move to the open state when hydraulic fluid flows through the pilot line.

17. A method of securing a latch pin in a latched position, the latch pin being provided in a latch pin assembly coupled to a hydraulic fluid source, the method comprising:
  mechanically locking the latch pin in the latched position by mechanically engaging the latch pin with a lock cam; and
  hydraulically locking the latch pin in the latched position by preventing fluid flow from exiting an extend chamber of the latch pin through a latching hydraulic line fluidly communicating between the hydraulic fluid source the extend chamber.

18. The method of claim 17, in which mechanically locking the latch pin comprises actuating a first lock actuator to bias the lock cam toward a lock position, wherein the lock cam in the locked position mechanically engages the latch pin.

19. The method of claim 17, wherein a check valve is disposed in the latching hydraulic line and has an initial state, in which fluid flow through the latching hydraulic line is blocked, and an open state, in which fluid flow through the latching hydraulic line is permitted, and in which hydraulically locking the latch pin comprises placing the check valve in the initial state.

20. The method of claim 17, in which the latch pin includes a latch pin surface, and in which mechanically locking the latch pin comprises mechanically engaging the lock cam with the latch pin surface.

* * * * *